(12) United States Patent
Hunkins (10) Patent No.: US 10,909,060 B2
(45) Date of Patent: Feb. 2, 2021

(54) DATA TRANSMISSION USING FLIPPABLE CABLE

(71) Applicant: ATI Technologies ULC, Markham (CA)

(72) Inventor: James Hunkins, Toronto (CA)

(73) Assignee: ATI Technologies ULC, Markham (CA)

( * ) Notice: Subject to any disclaimer, the term of this patent is extended or adjusted under 35 U.S.C. 154(b) by 71 days.

(21) Appl. No.: 16/216,277

(22) Filed: Dec. 11, 2018

(65) Prior Publication Data

US 2020/0183868 A1    Jun. 11, 2020

(51) Int. Cl.
*G06F 13/40* (2006.01)
*G06F 13/42* (2006.01)
*G06F 13/38* (2006.01)

(52) U.S. Cl.
CPC ........ *G06F 13/4018* (2013.01); *G06F 13/382* (2013.01); *G06F 13/4022* (2013.01); *G06F 13/4068* (2013.01); *G06F 13/4213* (2013.01)

(58) Field of Classification Search
CPC .... G06F 13/00; G06F 13/4018; G06F 13/382; G06F 13/4068; G06F 13/4213
See application file for complete search history.

(56) References Cited

U.S. PATENT DOCUMENTS

| | | | |
|---|---|---|---|
| 5,955,703 | A | 9/1999 | Daly et al. |
| 6,350,063 | B1 | 2/2002 | Gilliland et al. |
| 6,974,262 | B1 | 12/2005 | Rickenbach |

(Continued)

FOREIGN PATENT DOCUMENTS

| | | |
|---|---|---|
| WO | 2013085495 A1 | 6/2013 |
| WO | 2013089704 A1 | 6/2013 |

OTHER PUBLICATIONS

"Universal Serial Bus Type-C Cable and Connector Specification"; white paper; USB 3.0 Promoter Group: Apple Inc., Hewlett-Packard Inc., Intel Corporation, Microsoft Corporation, Renesas, STMicroelectronics, and Texas Instruments; Release 1.3; Jul. 14, 2017; 241 pages.

(Continued)

*Primary Examiner* — Tim T Vo
*Assistant Examiner* — Kim T Huynh
(74) *Attorney, Agent, or Firm* — Polansky & Associates, P.L.L.C.; Paul J. Polansky (57) ABSTRACT

A data transmission medium includes first and second conductors and a first reversible plug connector coupled to a first end thereof. The first reversible plug connector includes a plurality of signal pins, a crossbar switch, a receiver, and a transmitter. In response to a first configuration state, the plurality of signal pins includes a first predetermined number of reception pins and a second predetermined number of transmission pins. The first and second predetermined numbers are different from each other and each is greater than zero. The crossbar switch couples the first predetermined number of reception pins to a first port and the second predetermined number of transmission pins to a second port. The receiver has an input coupled to the first conductor, and an output coupled to the first port. The transmitter has an input coupled to the second port and an output coupled to the second conductor.

20 Claims, 4 Drawing Sheets

(56) References Cited

U.S. PATENT DOCUMENTS

| | | | |
|---|---|---|---|
| 7,186,144 | B1 | 3/2007 | Khemakhem et al. |
| RE40,749 | E | 6/2009 | Fogg |
| 8,561,879 | B2 | 10/2013 | Jol et al. |
| 8,647,156 | B2 | 2/2014 | Golko et al. |
| 8,777,666 | B2 | 7/2014 | Golko et al. |
| 8,931,962 | B2 | 1/2015 | Jol et al. |
| 9,054,477 | B2 | 6/2015 | Brickner et al. |
| 9,071,364 | B1* | 6/2015 | Voois ............... H04B 10/2507 |
| 9,093,803 | B2 | 7/2015 | Soohoo et al. |
| 9,244,872 | B2 | 1/2016 | Barbiero et al. |
| 9,350,125 | B2 | 5/2016 | Jones et al. |
| 9,667,007 | B2 | 5/2017 | Terlizzi et al. |
| 2012/0290761 | A1* | 11/2012 | Chen ................ G06F 13/4045 710/305 |
| 2014/0206209 | A1 | 7/2014 | Kamei et al. |
| 2014/0211351 | A1* | 7/2014 | Shoykhet ............. G06F 13/38 361/86 |
| 2014/0344484 | A1* | 11/2014 | Tian ................ G06F 11/325 710/19 |
| 2019/0196924 | A1* | 6/2019 | Gregg ................ H01R 13/64 |

OTHER PUBLICATIONS

"Universal Serial Bus 3.2 Specification"; white paper; USB 3.0 Promoter Group: Apple Inc., Hewlett-Packard Inc., Intel Corporation, Microsoft Corporation, Renesas, STMicroelectronics, and Texas Instruments; Revision 1.0; Sep. 22, 2017; 548 pages.

"On-The-Go and Embedded Host Supplement to the USB Revision 3.0 Specification"; white paper; USB 3.0 Promoter Group: Apple Inc., Hewlett-Packard Inc., Intel Corporation, Microsoft Corporation, Renesas, STMicroelectronics, and Texas Instruments; Revision 1.1; May 10, 2012; 74 pages.

"Inter-Chip Supplement to the USB Revision 3.0 Specification"; white paper; Texas Instruments, Hewlett-Packard Company, Intel Corporation, Microsoft Corporation, Renesas Corporation and ST-Ericsson; Revision 1.02; May 19, 2014; 72 pages.

"Universal Serial Bus Type-C Cable Auethentication Specification"; white paper; USB 3.0 Promoter Group: Apple Inc., Hewlett-Packard Inc., Intel Corporation, Microsoft Corporation, Renesas, STMicroelectronics, and Texas Instruments; Revision 1.0 with ECN and Errata; Jul. 24, 2017; 66 pages.

"USB 3.1 Device Class Specification for Debug Devices"; white paper; USB 3.0 Promoter Group: Apple Inc., Hewlett-Packard Inc., Intel Corporation, Microsoft Corporation, Renesas, STMicroelectronics, and Texas Instruments; Revision 1.0; Jul. 14, 2015; 129 pages.

"USB 3.1 Legacy Cable and Connector Specification"; white paper; Hewlett-Packard Inc., Intel Corporation, Microsoft Corporation, Renesas, STMicroelectronics, and Texas Instruments; Revision 1.0 including all errata and ECNs; Sep. 22, 2017; 74 pages.

"Universal Serial Bus Type-CTM Port Controller Interface Specification"; white paper; USB 3.0 Promoter Group: Apple Inc., Hewlett-Packard Inc., Intel Corporation, Microsoft Corporation, Renesas, STMicroelectronics, and Texas Instruments; Revision 2.0, Version 1.0; Oct. 2017; 103 pages.

"Universal Serial Bus Power Delivery Specification"; white paper; USB 3.0 Promoter Group: Apple Inc., Hewlett-Packard Inc., Intel Corporation, Microsoft Corporation, Renesas, STMicroelectronics, and Texas Instruments; Revision 3.0, Version 1.2; Jun. 21, 2018; 614 pages.

"Universal Serial Bus Type-C Locking Connector Specification" white paper; USB 3.0 Promoter Group: Apple Inc., Hewlett-Packard Inc., Intel Corporation, Microsoft Corporation, Renesas, STMicroelectronics, and Texas Instruments; Revision 1.0; Mar. 9, 2016; 13 pages.

* cited by examiner

DATA TRANSMISSION USING FLIPPABLE CABLE

BACKGROUND

Cabling between wired electrical components, such as personal computers and printers or mobile phones and chargers, has advanced in recent years and provided new features for better performance and user experience. For example, speeds have improved, making functions such as printing documents faster. In system such as mobile devices and chargers, new cabling techniques have allowed users to simply plug their charging cables into the mobile phones without needing to ensure the right plug end is connected to the phone and the plug end is connected with the right side up. Connectors such as the Universal Serial Bus, version C (USB-C) and the cable connector developed by and sold under the trademark "Lightening" owned by Apple Computer of Cupertino, Calif. have made it easier for users to plug in components. However, some applications require asymmetrical transmission speeds, i.e. speeds that are higher in one direction than the other, making it difficult to provide flippable cables with high performance but reasonable cost.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. Additionally, the terms remap and migrate, and variations thereof, are utilized interchangeably as a descriptive term for relocating.

DETAILED DESCRIPTION OF ILLUSTRATIVE EMBODIMENTS

As will be described in detail below, in one form, a data transmission medium includes a first conductor, a second conductor, and a first reversible plug connector coupled to a first end of the data transmission medium. The first reversible plug connector includes a plurality of signal pins, a crossbar switch, a receiver, and a transmitter. In response to a first configuration state, the plurality of signal pins forms a first predetermined number of reception pins and a second predetermined number of transmission pins, wherein the first predetermined number and the second predetermined number are different from each other and each is greater than zero. The crossbar switch couples the first predetermined number of reception pins to a first port and the second predetermined number of transmission pins to a second port. The receiver has an input coupled to the first conductor, and an output coupled to the first port. The transmitter has an input coupled to the second port and an output coupled to the second conductor.

In another form, an asymmetric flippable cable includes a first optical fiber having a first end and a second end, a second optical fiber having a first end and a second end, and a first reversible plug connector coupled to the first end of the first optical fiber and to the first end of the second optical fiber. The first reversible plug connector includes a plurality of signal pins, a crossbar switch, an optical receiver, and an optical transmitter. In response to a first configuration state, the plurality of signal pins forms a first predetermined number of reception pins and a second predetermined number of transmission pins, wherein the first predetermined number and the second predetermined number are different from each other and each is greater than zero. The crossbar switch couples the first predetermined number of reception pins to a first port and the second predetermined number of transmission pins to a second port. The optical receiver has an input coupled to the first optical fiber, and an output coupled to the first port. The optical transmitter has an input coupled to the second port and an output coupled to the second optical fiber.

In yet another form, a method includes transmitting a first predetermined number of signals from a first end of a first optical fiber physically attached to a first plug to a second end of the first optical fiber physically attached to a second plug using a first optical transmitter. A first predetermined number of signals is switched from corresponding pins of the first plug to inputs of the first optical transmitter. A second predetermined number of signals is transmitted from a second end of a second optical fiber physically attached to the second plug to a first end of the second optical fiber physically attached to the first plug using a second optical transmitter. The second predetermined number of signals is switched from corresponding pins of the second plug to inputs of the second optical transmitter. In response to a first configuration state, the first predetermined number and the second predetermined number are different from each other and each is greater than zero.

Figure 1:
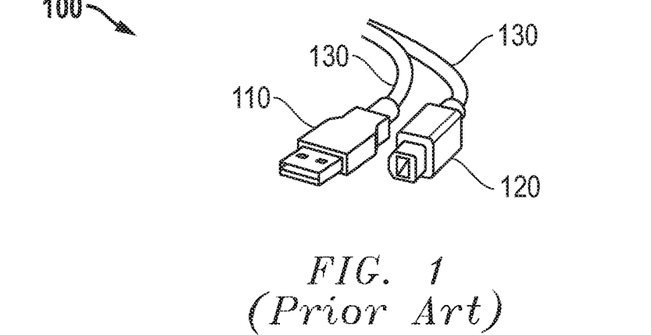
FIG. 1 illustrates a perspective diagram of a first type of cable known in the prior art.
Figure 2:
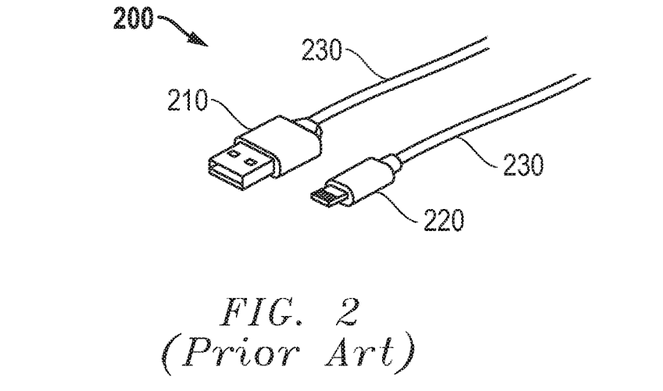
FIG. 2 illustrates a perspective diagram of a second type of cable known in the prior art.

FIG. 1 illustrates a perspective diagram of a first type of cable 100 known in the prior art. Cable 100 complies with a standard known as the Universal Serial Bus (USB) standard, versions 1.0 and 2.0, introduced in 1996 and 2001, respectively. The USB standard was developed by a consortium of companies to make it easier to connect external devices to PCs by replacing the multitude of existing types of connectors at the back of personal computers with a single type of connector. Cable 100 includes a plug 110 and a plug 120 connected together by a set of wires 130, portions of which are shown in FIG. 2. Plug 110 is known as a "type A" plug and can be connected, for example, to a corresponding receptacle on a personal computer. Plug 120 is known as a "type B" plug and can be connected, for example, to a corresponding receptacle on a computer peripheral such as a printer. Data rates are 187.5 kilobits per second (kbps) in a low speed mode and 1.5 megabits per second (Mbps) in a high-speed mode for USB 1.0, and 60 Mbps for USB 2.0. As can be seen from the drawings, each plug of cable 100 is different from each other and has a unique insertion polarity into the corresponding socket so that the plug will align and mechanically and electrically connect to the corresponding socket, and the signals on the plug will match with the signals on the socket without contention or shorting. Other USB cables include two "type A" connectors on either end of the cable.

FIG. 2 illustrates a perspective diagram of a second type of cable 200 known in the prior art. Cable 200 includes a first plug 210 and a second plug 220 connected together by a set of wires 230, portions of which are shown in FIG. 2. Plug 210 is a USB type A connector, but plug 220 is a connector known as a "Lightening" connector, the electrical and mechanical characteristics of which were developed by Apple Computer, Inc. of Cupertino, Calif. Apple Computer introduced the Lightening connector in 2012. The Lightening connector is an 8-pin connector, and has the feature that the pins on the top of the connector are the same as the pins on the bottom, and plug 220 mates with a receptacle that has contacts on either the top or the bottom and that senses the orientation of the signals. Thus plug 220 can be inserted with either polarity, whereas plug 210 must be inserted with a certain polarity into the USB receptacle. Cable 200 includes one USB type A connector and one Lightening connector, but in other configurations it can include other combinations, such as a Lightening connector on each end.

Figure 3:
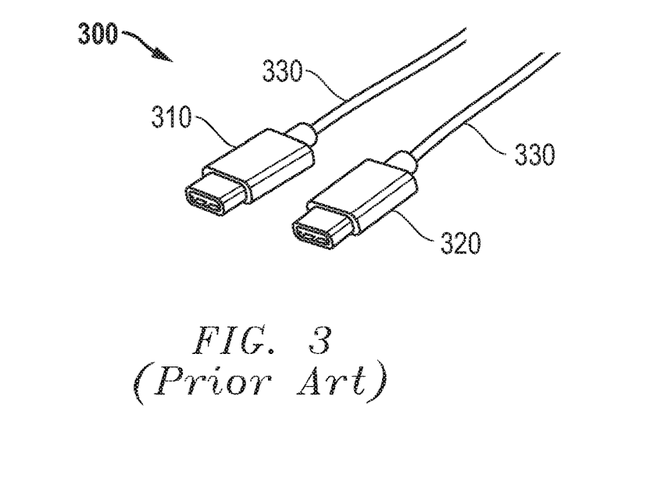
FIG. 3 illustrates a perspective diagram of a third type of cable known in the prior art.

FIG. 3 illustrates a perspective diagram of a third type of cable 300 known in the prior art. Cable 300 complies with a standard known as the USB-C or USB Type C, introduced in 2014. Cable 300 includes a plug 310 and a plug 320 connected together by a set of wires 330, portions of which are shown in FIG. 3. In cable 300, each of plugs 310 and 320 is a USB-C plug. Each of plugs 210 and 220 provides, among other pins, pins for two data channels using pairs of unidirectional differential pins, one legacy channel, pins providing power and ground, and pins for providing configuration signals. A USB-C cable can be inserted with either polarity without contention, but circuitry on the main board at each end determines the orientation of the cable. USB-C cables can transmit data at 480 Mbps as specified in the USB 2.0 standard, but optionally provide 10 Gbps data transmission capability if they implement the optional "super speed" channel specified in USB 3.1, second generation. The pinouts of a USB-C, connector and receptacle will now be described.

Figure 4:
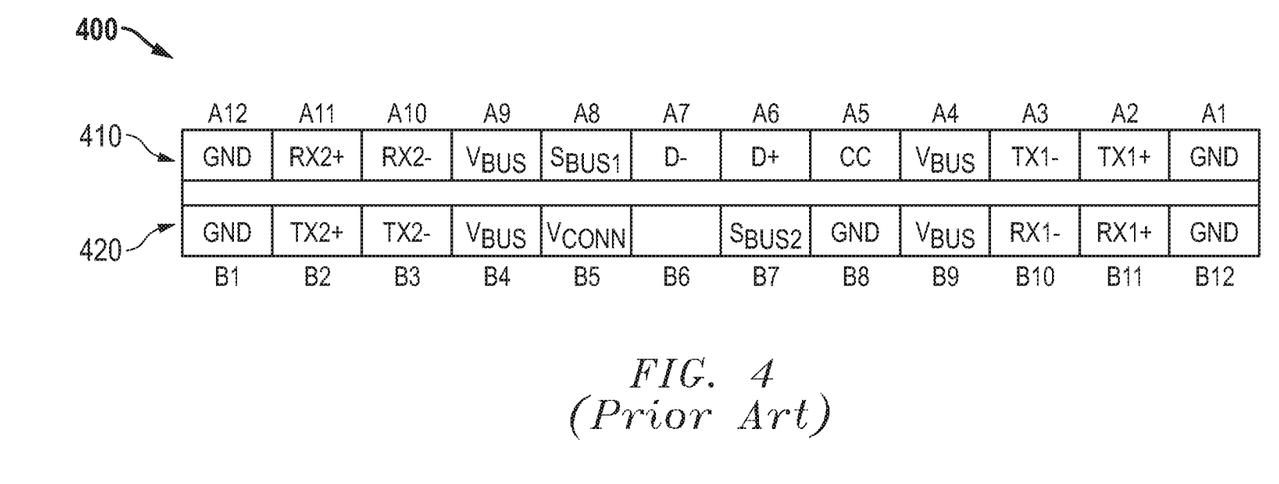
FIG. 4 illustrates a pinout diagram showing the signal assignments of a plug of the cable of FIG. 3 when looking into the plug.

FIG. 4 illustrates a pinout diagram 400 showing the signal assignment of a plug of cable 300 of FIG. 3 when looking into the cable. Pinout diagram 400 includes a top row of conductors 410 containing twelve conductors labeled right-to-left as "A1" through "A12", and a bottom row of conductors 420 containing conductors labeled left-to-right as "B1" through "B12". The function of these conductors is illustrated in TABLE I below:

TABLE I

| Plug 1 Pin Number | Plug 1 Pin Name | Cable Description | Plug 2 Pin Number | Plug 2 Pin Name |
| --- | --- | --- | --- | --- |
| A1 | GND | Ground for power return | A1 | GND |
| A2 | TX1+ | Shielded differential pair #1, positive | A2 | RX1+ |
| A3 | TX1− | Shielded differential pair #1, positive | A3 | RX1− |
| A4 | $V_{BUS}$ | $V_{BUS}$ power | A4 | $V_{BUS}$ |
| A5 | CC | Configuration channel | A5 | CC |
| A6 | D+ | Unshielded twisted pair, positive | A6 | D+ |
| A7 | D− | Unshielded twisted pair, negative | A7 | D− |

TABLE I-continued

| Plug 1 Pin Number | Plug 1 Pin Name | Cable Description | Plug 2 Pin Number | Plug 2 Pin Name |
| --- | --- | --- | --- | --- |
| A8 | SBU1 | Sideband use A | B8 | SBU1 |
| A9 | $V_{BUS}$ | $V_{BUS}$ power | A9 | $V_{BUS}$ |
| A10 | RX2− | Shielded differential pair #4, negative | B3 | TX2− |
| A11 | RX2+ | Shielded differential pair #4, positive | A11 | TX2+ |
| A12 | GND | Ground for power return | A12 | GND |
| B1 | GND | Ground for power return | B1 | GND |
| B2 | TX2+ | Shielded differential pair #3, positive | A11 | RX2+ |
| B3 | TX2− | Shielded differential pair #3, negative | A10 | RX2− |
| B4 | $V_{BUS}$ | $V_{BUS}$ power | B4 | $V_{BUS}$ |
| B5 | $V_{CONN}$ | $V_{CONN}$ power for powered cables | B5 | $V_{CONN}$ |
| B6 | Not used | Unused | B6 | Not used |
| B7 | Not used | Unused | B7 | Not used |
| B8 | SBU2 | Sideband use B | A8 | SBU1 |
| B9 | $V_{BUS}$ | $V_{BUS}$ power | B9 | $V_{BUS}$ |
| B10 | RX1− | Shielded differential pair #2, negative | A3 | TX1− |
| B11 | RX1+ | Shielded differential pair #2, positive | A2 | TX1+ |

Figure 5:
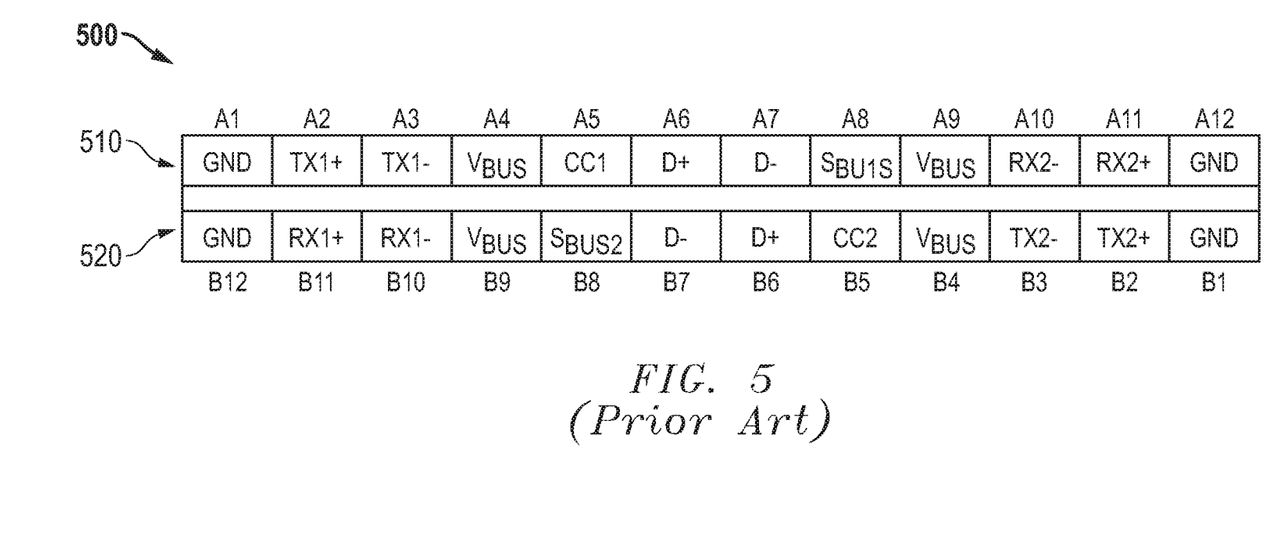
FIG. 5 illustrates a pinout diagram showing the signal assignment of a receptacle for use with the cable of FIG. 3 when looking into the receptacle.

FIG. 5 illustrates a pinout diagram 500 showing the signal assignment of a receptacle for use with the cable of FIG. 3 when looking into the receptacle. Pinout diagram 500 includes a top row of conductors 510 containing twelve conductors oriented left-to-right as A1-A12, and a bottom row of conductors 520 containing twelve conductors oriented right-to-left as B1-B12. Note that pinout diagram 500 is generally a mirror image of pinout diagram 400 of FIG. 4, with a couple of exceptions. First, the receptacle conducts the USB 2.0 D+ and D− signals on both the top and bottom but in a mirrored-image fashion, whereas the plug only has a single set of conductors A6 and A7 for transmitting the USB 2.0 D+ and D− signals. Second, a symmetrical set of interior pins A4, A9, B4, and B9 conducts VBUS power and a symmetrical set of corner pins A1, A12, B1, and B12 conducts the ground for power return, making it impossible to short signals with power or ground pins regardless of plug orientation.

Another feature is also significant: the location of corresponding pins for transmit and receive pairs to establish a direction of the cable. For example, for a complete USB-C cable, pins A2 and A3 on one end forms a transmit pair TX1+ and TX1− for conducting signals into the cable, and a receive pair on the opposite end. Wires from pins A2 and A3 on one end are connected to B10 and B11 on the other end, and vice versa. Thus, the cable itself establishes the direction of the signals and is fully symmetrical. However to provide both the symmetrical plug polarity and cable direction, it is necessary to provide matching pins (for power and ground) and corresponding pins that are cross-wired inside the cable.

While both the Lightening connector and the USB-C plug avoid the insertion polarity problem of USB-A and USB-B cables, other problems remain to be solved. One problem is that both Lightening connectors and USB-C cables assume symmetrical transmission and reception capability. Thus for example each direction must support 480 Mbps transmission speeds on each USB 2.0 transmit and receive pair. In many applications, however, there is a need asymmetrical transmission speeds at a higher overall bandwidth in one direction. It would be desirable to provide a flippable that supports asymmetrical transmission rates but is also inexpensive.

Figure 6:
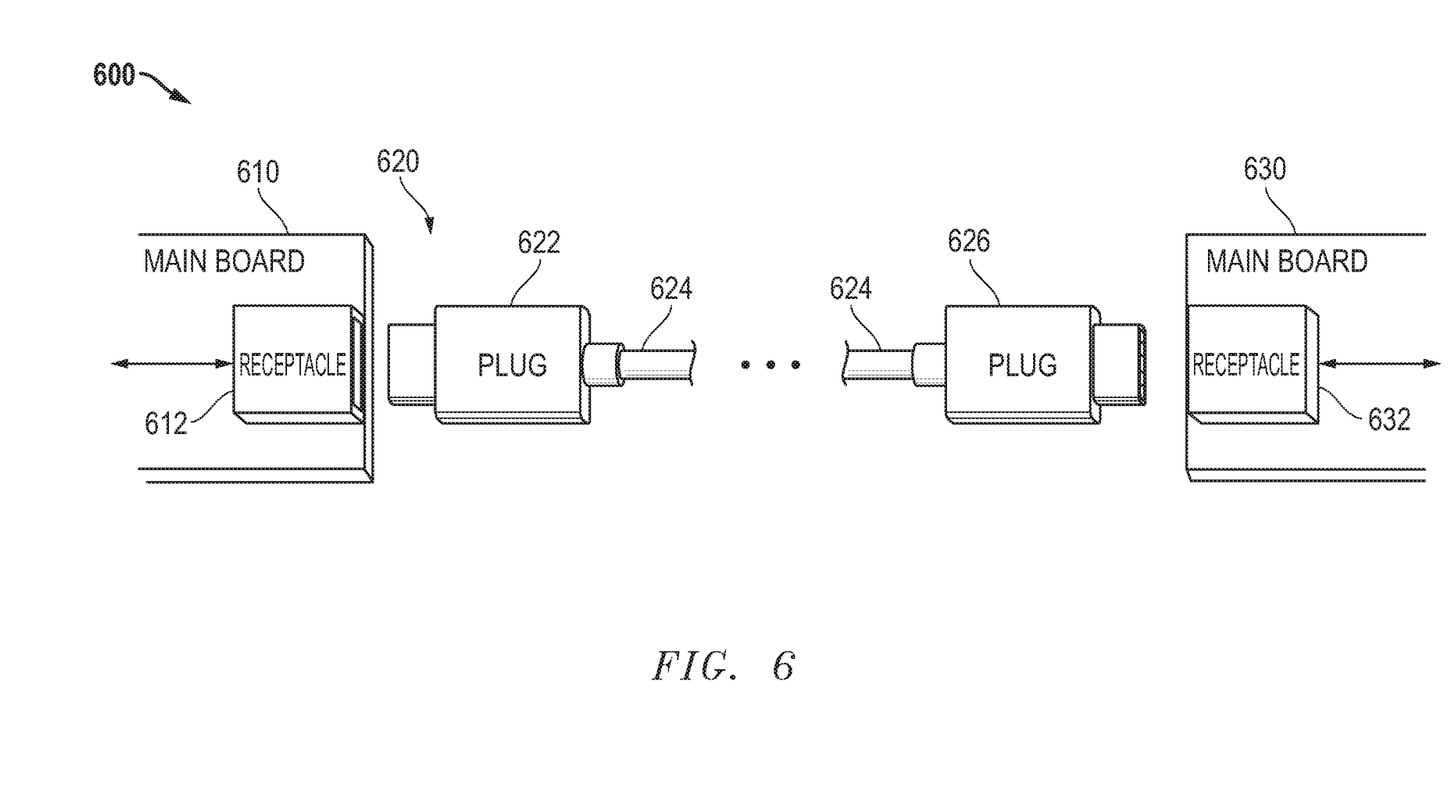
FIG. 6 illustrates in block diagram form a data transmission system using an active flippable cable according to some embodiments.

FIG. 6 illustrates in block diagram form a data transmission system 600 using an active flippable cable 620 according to some embodiments. Data transmission system 600 includes a main board 610 having a receptacle 612, active flippable cable 620, and a main board 630 having a receptacle 632. Active flippable cable 620 includes a plug 622, a set of conductors 624, and a plug 626. Each of plugs 622 and 626 is a reversible plug connector that can have a physical size and shape the same as, for example, USB-C compliant plugs as shown in FIG. 3 and with the same internal electrical circuitry that will be described below. Conductors 624 are a set of conductors that allow active flippable cable 620 to be reversible and can be implemented by, for example, cable 300 shown in FIG. 3 and having the wirings shown in TABLE I. According to various embodiments described herein, active flippable cable 620 has the capability to support asymmetric transmission while retaining the ability to be flippable, while supporting either insertion polarity. As used herein, "active" means containing active circuitry, such as transistors, logic gates, and the like, as opposed to passive components like resistors and capacitors. Further details of active flippable cable 620 will now be described.

Figure 7:
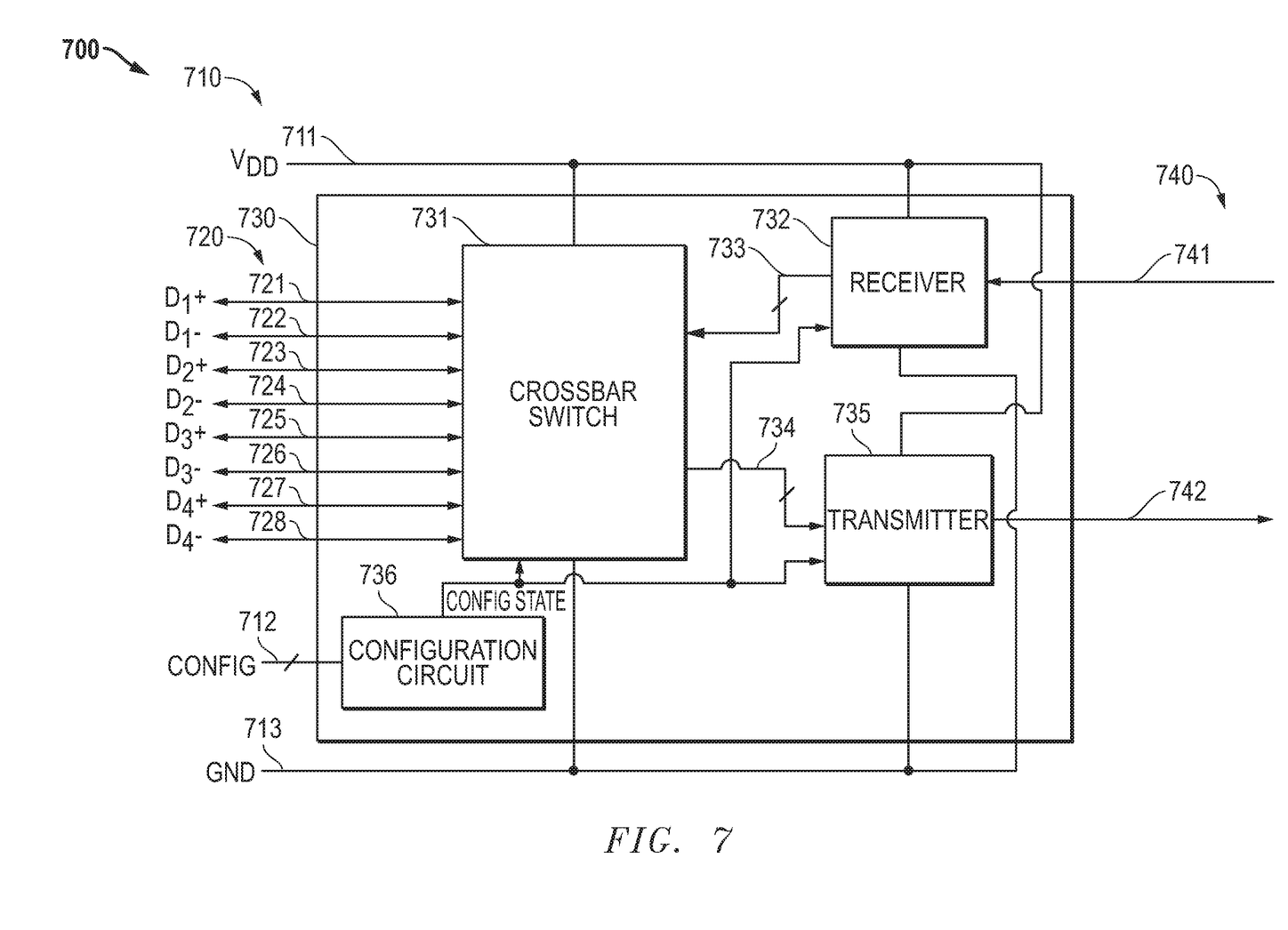
FIG. 7 illustrates in block diagram form a circuit for use in the active flippable cable of FIG. 6 according to some embodiments.

FIG. 7 illustrates in block diagram form a first circuit 700 for use in the active flippable cable 620 of FIG. 6 according to some embodiments. First circuit 700 includes generally a set of signal pins 710, a circuit board 730, and a set of conductors 740.

Signal pins 710 includes a power supply conductor 711 labeled "VDD", a set of configuration conductors 712 labeled "CONFIG", a ground conductor 713 labeled "GND", and a set of conductors 720. Conductors 720 include conductors 721 and 722 conducting true and complement signals for a first channel labeled "$D_1+$" and "$D_1-$", respectively; conductors 723 and 724 conducting true and complement signals for a second channel labeled "$D_2+$" and "$D_2-$", respectively; conductors 725 and 726 conducting true and complement signals for a third channel labeled "$D_3+$" and "$D_3-$", respectively; and conductors 727 and 728 conducting true and complement signals for a fourth channel labeled "$D_4+$" and "$D_4-$", respectively.

Circuit board 730 includes a crossbar switch 731, a receiver 732, a transmitter 735, and a configuration circuit 736. Crossbar switch 731 is connected to power supply conductor 711 and ground conductor 713, has an input for receiving a configuration signal labeled "CONFIG", a left-side port connected to conductors 721-728, and a right-side port having an input and an output. Crossbar switch 731 can be implemented with any circuit or collection of circuits that selectively routes signals between ports, including but not limited to a set of multiplexers. Receiver 732 is connected to power supply conductor 711 and ground conductor 713, has an input, and an output port 733 connected to the input of the right-side port of crossbar switch 731 using a set of conductors, and a control input. Transmitter 735 is connected to power supply conductor 711 and ground conductor 713 and has an input port 734 connected to the output of the right-side port of crossbar switch 731 using a set of conductors, an output, and a control input. Configuration circuit 736 has an input connected to configuration conductors 712 for receiving the CONFIG signal, and an output connected to the input of crossbar switch 731 and to the control inputs of receiver 732 and transmitter 735 for providing the CONFIG STATE signal thereto.

Conductors 740 include a first set of conductors 741 and a second set of conductors 742, each set including one or more conductors as will be explained further below. Conductors 741 conduct signals from a second plug, not shown in FIG. 7, to the input of optical receiver 722. Conductors 742 conduct signals pairs from the output of optical transmitter 724, to the second plug.

In the example of a USB-C compatible physical plug, each electrical element on circuit board 730 is powered from power supply conductor 711 and ground conductor 713. In the illustrated embodiment, circuit board 731 is a small form factor circuit board or "paddle board" that physically fits inside and is connected to the contacts of the USB-C connector.

In some embodiments, crossbar switch 731, receiver 732, transmitter 735, and configuration circuit 736 can be implemented as separate integrated circuits on circuit board 730. In other embodiments, crossbar switch 731 and configuration circuit 736 can be implemented as a single complementary metal-oxide-semiconductor (CMOS) integrated circuit, while receiver 732 and transmitter 735 can be implemented as a separate integrated circuit using a different manufacturing process that provides very high switching speed transistors suitable for use in optical communication, such as Gallium Arsenide.

In the exemplary embodiment, receiver 732 is an optical receiver and transmitter 735 is an optical transmitter. Conductors 741 and 742 are optical fibers capable of very high bandwidth operation.

In operation the polarity and direction of the cable are indicated by the CONFIG STATE signal. The CONFIG STATE signal can be formed in a variety of ways. For example, if the plug has contacts as specified in USB-C specification, including the location of the VCONN supply pin and by configuration channel detection. In some embodiments, the Alternate Mode can be used to re-assign the pins of plugs 622 and 626 to provide more data bandwidth in one mode versus another mode. The presence of Alternative Mode devices and discovery of their characteristics can be discovered during system enumeration.

One exemplary alternative configuration would be a system that requires higher downstream bandwidth than upstream bandwidth, in which the downstream direction is considered to be left to right. In this case, the system can assign three sets of pins to be transmit pins, providing three downstream channels and one upstream channel. In this case, the CONFIG STATE signal would cause transmitter 735 to combine the signals from the $D_1+/D_1-$, $D_2+/D_2-$, and $D_3+/D_3-$ signal pairs into the signal transmitted on optical fiber 742. For example, the three channels of data can be time division multiplexed onto optical fiber 742. The pin assignments of the relevant pins are shown in TABLE II below:

TABLE II

| Plug 1 Pin | Plug 1 Pin Function | Cable Description | Plug 2 Pin Function | Plug 2 Pin |
|---|---|---|---|---|
| $D_1+$ | $TX_1+$ | Optical fiber 742 | $RX_1+$ | $D_1+$ |
| $D_1-$ | $TX_1-$ | Optical fiber 742 | $RX_1-$ | $D_1-$ |
| $D_2+$ | $TX_2+$ | Optical fiber 742 | $RX_1+$ | $D_2+$ |
| $D_2-$ | $TX_2-$ | Optical fiber 742 | $RX_1-$ | $D_2-$ |
| $D_3+$ | $TX_3+$ | Optical fiber 742 | $RX_1+$ | $D_3+$ |
| $D_3-$ | $TX_3-$ | Optical fiber 742 | $RX_1-$ | $D_3-$ |
| $D_4+$ | $RX_1+$ | Optical fiber 741 | $TX_1+$ | $D_4+$ |
| $D_4-$ | $RX_1-$ | Optical fiber 741 | $TX_1-$ | $D_4-$ |

Active flippable cable 620 provides several benefits over known data transmission media. First, it allows re-configuration for asymmetric operation while using a single generic flippable cable. Each end of the cable can be configured by appropriate software drivers based on the particular system requirements. The circuitry that manages the configuration is placed on small paddle cards in the plugs themselves, and does not require a separate power supply but is powered from the VDD and GND power supplies provided by the main board.

Second, while active flippable cable 620 can use the existing USB-C physical connector and can have a similar pinout definition and a similar software driver interface, it allows the implementation of non-USB-C data rates and the ability to exceed the performance currently specified in the USB-C standard. For example, USB-C specifies two unidirectional data channels supporting 5 Gbps or 10 Gbps data rates. However by using optical fibers as the physical media and combining the channels on a single high-speed cable, data rates well in excess of 10 Gbps can be achieved. Moreover the configuration space registers and modes supported by USB-C can be easily extended to support active flippable cable 620.

Third, existing mechanisms for sensing polarity can be used to configure the crossbar switch, the receiver, and the transmitter for desired signal routing.

Fourth, the provision of higher data rates than needed with asymmetric operation allows the cables to be flippable since the cable supports asymmetric transmission in either direction.

Fifth, active flippable cable 620 can be configured to reduce power in asymmetric modes for the lower-bandwidth direction. For example, if a node had a higher transmit bandwidth requirement than receive, the receiver clock speed could be reduced to save power while transferring the required amount of data.

Sixth, the data channel re-routing provided by crossbar switch 731 avoids the need for expensive transceivers to be placed on each pair of data conductors. This characteristic is especially useful for tunneling applications.

The exemplary embodiment disclosed above can be altered in various ways in other embodiments. For example, conductors 740 can include more optical fibers or a higher bandwidth fiber, and each of receiver 732 and transmitter 735 can multiplex the receive or transmit signals, respectively, from or to the separate optical fibers. Moreover because the transmission capabilities of optical signaling exceeds those of electrical signaling for most applications, active flippable cable 620 is able to provide asymmetrical operation without regard to cable orientation. However depending on the exact system requirements, in other embodiments receiver 732 and transmitter 735 can be implemented with an active electrical receiver and transmitter, respectively, and the optical fibers in conductors 740 can be replaced by differential shielded pairs of conductive wires.

In other embodiments, different form factor plugs and receptacles can be used. In these embodiments, polarity-sensing plugs or universal polarity plugs (like the Lightening connector and the USB-C connector) can be used to maintain flippability and reversible polarity.

The electrical components of the paddle card, for example, crossbar switch 731, receiver 732, transmitter 735, and configuration circuit 736 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. Accordingly, it is intended by the appended claims to cover all modifications of the disclosed embodiments that fall within the scope of the disclosed embodiments.

What is claimed is:

1. A data transmission medium comprising:
   a first conductor;
   a second conductor; and
   a first reversible plug connector coupled to a first end of the data transmission medium, comprising:
   a plurality of signal pins that in response to a first configuration state forms a first predetermined number of reception pins and a second predetermined number of transmission pins, wherein said first predetermined number and said second predetermined number are different from each other and each is greater than zero;
   a crossbar switch for coupling said first predetermined number of reception pins to a first port and said second predetermined number of transmission pins to a second port;
   a receiver having an input coupled to said first conductor, and an output coupled to said first port; and
   a transmitter having an input coupled to said second port and an output coupled to said second conductor.

2. The data transmission medium of claim 1, wherein in said first configuration state, said transmitter is configured to operate at a greater data bandwidth than said receiver.

3. The data transmission medium of claim 1, wherein:
   in a second configuration state, said first predetermined number is equal to said second predetermined number.

4. The data transmission medium of claim 3, wherein in said second configuration state, said receiver is configured to operate at a greater data bandwidth than said transmitter.

5. The data transmission medium of claim 1, wherein said plurality of signal pins further comprises at least one configuration signal pin for receiving a configuration signal that selectively indicates said first configuration state.

6. The data transmission medium of claim 1, further comprising:
   a second reversible plug connector coupled to a second end of the data transmission medium and having the same size and shape as, and having corresponding internal circuitry to, said first reversible plug connector and that in response to said first configuration state includes said second predetermined number of reception pins and said first predetermined number of transmission pins.

7. The data transmission medium of claim 1, wherein said receiver comprises an optical receiver, said transmitter comprises an optical transmitter, said first conductor comprises a first optical fiber, and said second conductor comprises a second optical fiber.

8. The data transmission medium of claim 1, wherein said receiver comprises an active electrical receiver, and said transmitter comprises an active electrical transmitter.

9. The data transmission medium of claim 1, wherein said plurality of signal pins further comprises:
a power supply conductor coupled to said crossbar switch, said receiver, and said transmitter; and
a ground conductor coupled to said crossbar switch, said receiver, and said transmitter.

10. The data transmission medium of claim 1, further wherein said crossbar switch, said receiver, and said transmitter are coupled together and attached a paddle card inside said first reversible plug connector.

11. The data transmission medium of claim 1, wherein:
said first predetermined number of reception pins comprises at least one differential pair of reception pins, and said second predetermined number of transmission pins comprises at least one differential pair of transmission pins.

12. The data transmission medium of claim 1, wherein:
said first reversible plug connector is substantially compatible with the Universal Serial Bus, type C (USB-C) connector.

13. An active flippable cable comprising:
a first optical fiber having a first end and a second end;
a second optical fiber having a first end and a second end;
a first reversible plug connector coupled to said first end of said first optical fiber and to said first end of said second optical fiber, wherein said first reversible plug connector comprises:
a plurality of signal pins that in response to a first configuration state forms a first predetermined number of reception pins and a second predetermined number of transmission pins, wherein said first predetermined number and said second predetermined number are different from each other and each is greater than zero;
a crossbar switch for coupling said first predetermined number of reception pins to a first port and said second predetermined number of transmission pins to a second port;
an optical receiver having an input coupled to said first optical fiber, and an output coupled to said first port; and
an optical transmitter having an input coupled to said second port and an output coupled to said second optical fiber.

14. The active flippable cable of claim 13, further comprising:
a second reversible plug connector coupled to said second end of said first optical fiber and to said second end of said second optical fiber, having the same size and shape as, and having corresponding internal circuitry to, said first reversible plug connector, and that in response to said first configuration state includes said second predetermined number of reception pins and said first predetermined number of transmission pins.

15. The active flippable cable of claim 14, further wherein said crossbar switch, said optical receiver, and said optical transmitter are coupled together and attached a respective paddle card inside a respective one of said first and second reversible plug connectors.

16. The active flippable cable of claim 13, wherein:
in a second configuration state, said first predetermined number is equal to said second predetermined number.

17. A method comprising:
transmitting a first predetermined number of signals from a first end of a first optical fiber physically attached to a first plug to a second end of said first optical fiber physically attached to a second plug using a first optical transmitter;
switching said first predetermined number of signals from corresponding pins of said first plug to inputs of said first optical transmitter;
transmitting a second predetermined number of signals from a second end of a second optical fiber physically attached to said second plug to a first end of said second optical fiber physically attached to said first plug using a second optical transmitter; and
switching said second predetermined number of signals from corresponding pins of said second plug to inputs of said second optical transmitter,
wherein in response to a first configuration state, said first predetermined number and said second predetermined number are different from each other and each is greater than zero.

18. The method of claim 17, further comprising:
receiving said first predetermined number of signals from said second end of said first optical fiber using a first optical receiver;
switching said first predetermined number of signals from said first optical receiver to corresponding pins of said second plug;
receiving said second predetermined number of signals from said second end of said second optical fiber using a second optical receiver; and
switching said first predetermined number of signals from said second optical receiver to corresponding pins of said first plug.

19. The method of claim 18, wherein in a second configuration state, said first predetermined number is equal to said second predetermined number.

20. The method of claim 17, wherein:
switching said first predetermined number of signals from corresponding pins of said first plug to inputs of said first optical transmitter comprises switching differential electrical signals; and
switching said second predetermined number of signals from corresponding pins of said second plug to inputs of said second optical transmitter comprises switching differential electrical signals.

* * * * *